US012367909B2

(12) United States Patent
Cheng et al.

(10) Patent No.: US 12,367,909 B2
(45) Date of Patent: Jul. 22, 2025

(54) DATA PROCESSING DEVICE AND ELECTRONIC MODULE THEREOF

(71) Applicant: Wiwynn Corporation, New Taipei (TW)

(72) Inventors: Fu-Sheng Cheng, New Taipei (TW); Kuan-Chih Wang, New Taipei (TW); Po-Han Huang, New Taipei (TW); Hung-Chien Wu, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 160 days.

(21) Appl. No.: 18/218,124

(22) Filed: Jul. 5, 2023

(65) Prior Publication Data

US 2024/0321321 A1 Sep. 26, 2024

(30) Foreign Application Priority Data

Mar. 20, 2023 (TW) ................................. 112110147

(51) Int. Cl.
*G11B 33/12* (2006.01)
(52) U.S. Cl.
CPC .................................. *G11B 33/128* (2013.01)
(58) Field of Classification Search
CPC ............................... G11B 33/128; G11B 33/12
See application file for complete search history.

(56) References Cited

U.S. PATENT DOCUMENTS

| 9,373,060 | B2 * | 6/2016 | Zhang | H01R 13/62 |
| 10,863,644 | B1 * | 12/2020 | Tseng | H05K 7/1487 |
| 11,849,560 | B1 * | 12/2023 | Zhong | H05K 7/1489 |
| 11,864,336 | B2 * | 1/2024 | Tan | H05K 7/1489 |
| 11,991,852 | B2 * | 5/2024 | Shih | H05K 7/1487 |
| 2022/0377926 | A1 * | 11/2022 | Wang | G06F 1/183 |

FOREIGN PATENT DOCUMENTS

TW M402480 U1 4/2011

* cited by examiner

*Primary Examiner* — Imani N Hayman
*Assistant Examiner* — Hung Q Dang
(74) *Attorney, Agent, or Firm* — Winston Hsu

(57) ABSTRACT

A data processing device includes a base plate and an electronic module. The base plate includes N driving portions. The electronic module includes an electronic component, a tray and a recognition mechanism. The tray is configured to support the electronic component and includes N slots. The tray is disposed on the base plate, such that an i-th driving portion of the N driving portions is disposed in an i-th slot of the N slots. The recognition mechanism is disposed on the tray. The recognition mechanism includes N interfering portions and N receiving recesses. When the tray moves with respect to the base plate toward a first direction, the i-th driving portion moves within the i-th slot toward a second direction to push an i-th interfering portion of the N interfering portions to move, such that the i-th interfering portion extends into an i-th receiving recess of the N receiving recesses.

28 Claims, 19 Drawing Sheets

DATA PROCESSING DEVICE AND ELECTRONIC MODULE THEREOF

BACKGROUND OF THE INVENTION

1. Field of the Invention

The invention relates to a data processing device and an electronic module thereof and, more particularly, to an electronic module capable of achieving functions of recognition and foolproof and a data processing device equipped with the electronic module.

2. Description of the Prior Art

At present, many enterprises have set up data centers to centrally manage computing, storage, network and other equipment. A large number of hard disks are installed in the storage equipment to store a large amount of data. When the hard disk is damaged, it is necessary to reduce the time for replacing the hard disk as much as possible to maintain the normal operation of the data center. When replacing the hard disk, each hard disk must be installed on the corresponding position. If the hard disk is repeatedly installed on the wrong position, it will greatly increase the labor cost and increase the failure rate of the equipment.

SUMMARY OF THE INVENTION

According to an embodiment of the invention, a data processing device comprises a base plate and an electronic module. The base plate comprises N driving portions, wherein N is a positive integer larger than 1. The electronic module comprises an electronic component, a tray and a recognition mechanism. The tray is configured to support the electronic component. The tray comprises N slots, wherein positions of the N slots respectively correspond to positions of the N driving portions. The tray is movably disposed on the base plate, such that an i-th driving portion of the N driving portions is disposed in an i-th slot of the N slots, wherein i is a positive integer smaller than or equal to N. The recognition mechanism is disposed on the tray. The recognition mechanism comprises N interfering portions and N receiving recesses, wherein positions of the N interfering portions respectively correspond to positions of the N slots, and positions of the N receiving recesses respectively correspond to positions of the N interfering portions. When the tray moves with respect to the base plate toward a first direction, the i-th driving portion moves within the i-th slot toward a second direction to push an i-th interfering portion of the N interfering portions to move, such that the i-th interfering portion extends into an i-th receiving recess of the N receiving recesses, wherein the first direction is opposite to the second direction.

According to an embodiment of the invention, an electronic module is configured to be disposed on a base plate. The base plate comprises N driving portions, wherein N is a positive integer larger than 1. The electronic module comprises an electronic component, a tray and a recognition mechanism. The tray is configured to support the electronic component. The tray comprises N slots, wherein positions of the N slots respectively correspond to positions of the N driving portions. The tray is movably disposed on the base plate, such that an i-th driving portion of the N driving portions is disposed in an i-th slot of the N slots, wherein i is a positive integer smaller than or equal to N. The recognition mechanism is disposed on the tray. The recognition mechanism comprises N interfering portions and N receiving recesses, wherein positions of the N interfering portions respectively correspond to positions of the N slots, and positions of the N receiving recesses respectively correspond to positions of the N interfering portions. When the tray moves with respect to the base plate toward a first direction, the i-th driving portion moves within the i-th slot toward a second direction to push an i-th interfering portion of the N interfering portions to move, such that the i-th interfering portion extends into an i-th receiving recess of the N receiving recesses, wherein the first direction is opposite to the second direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
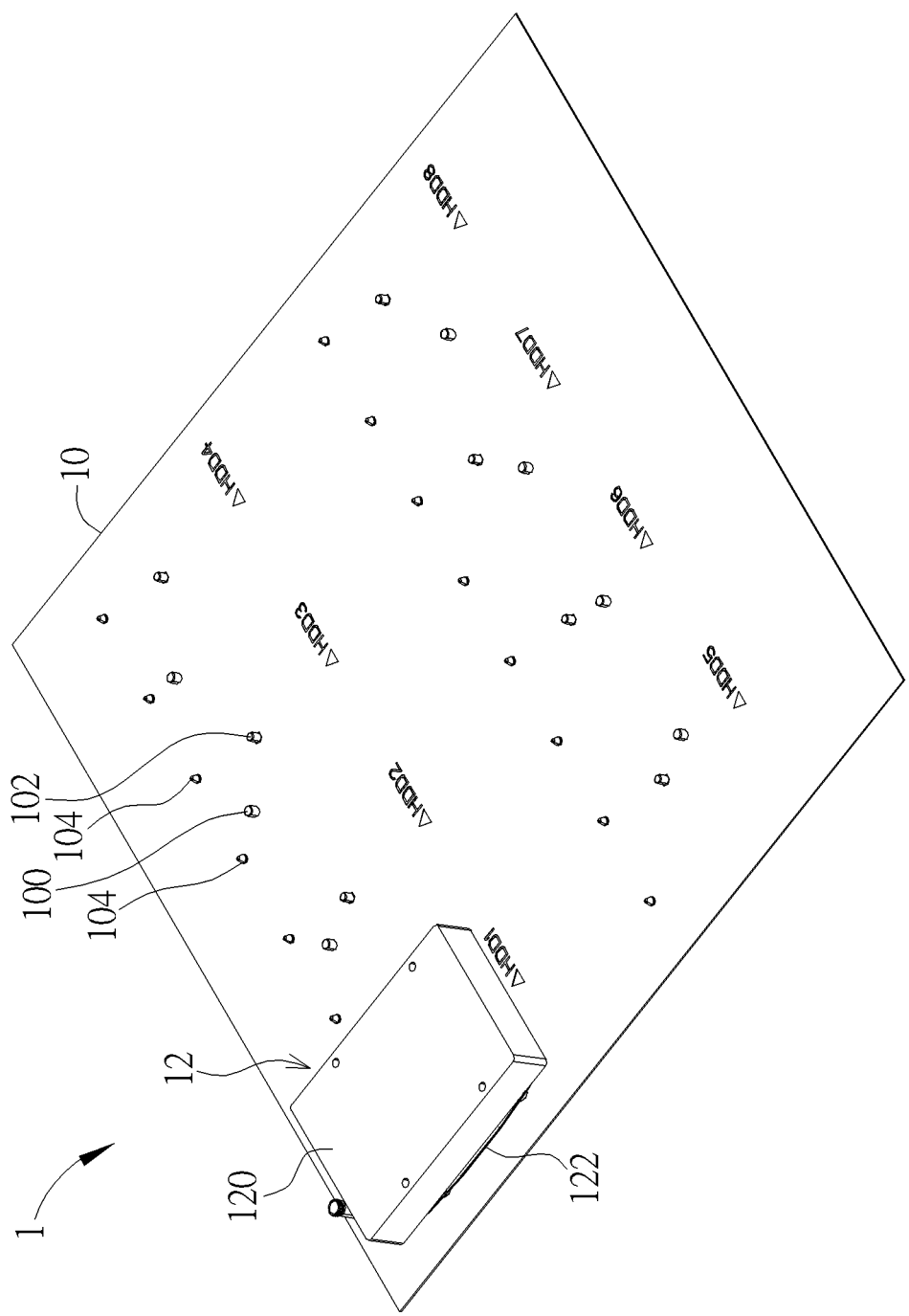
FIG. 1 is a perspective view illustrating a data processing device according to an embodiment of the invention.
Figure 2:
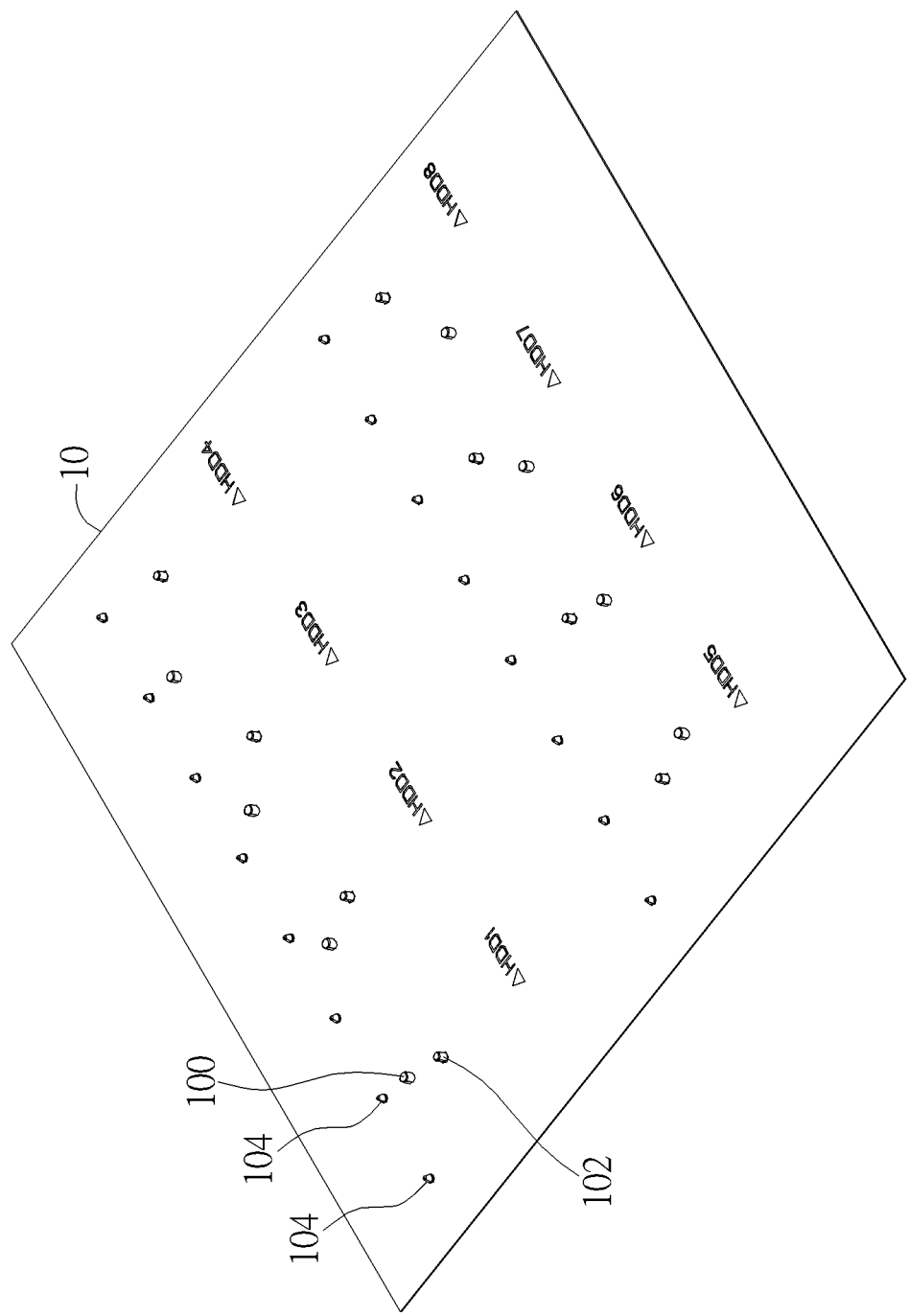
FIG. 2 is a perspective view illustrating a base plate shown in FIG. 1.
Figure 3:
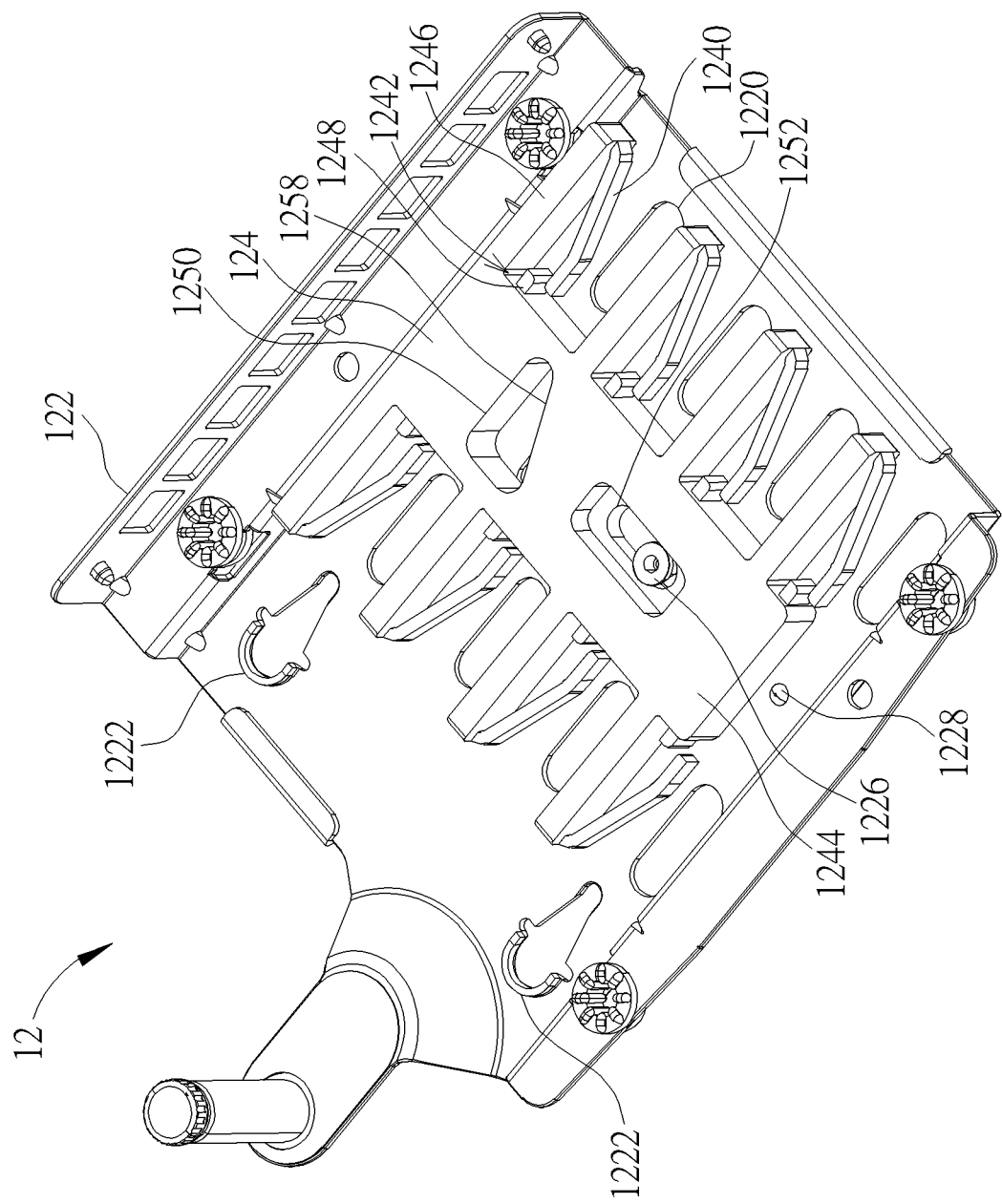
FIG. 3 is a perspective view illustrating a tray and a recognition mechanism according to an embodiment of the invention.
Figure 4:
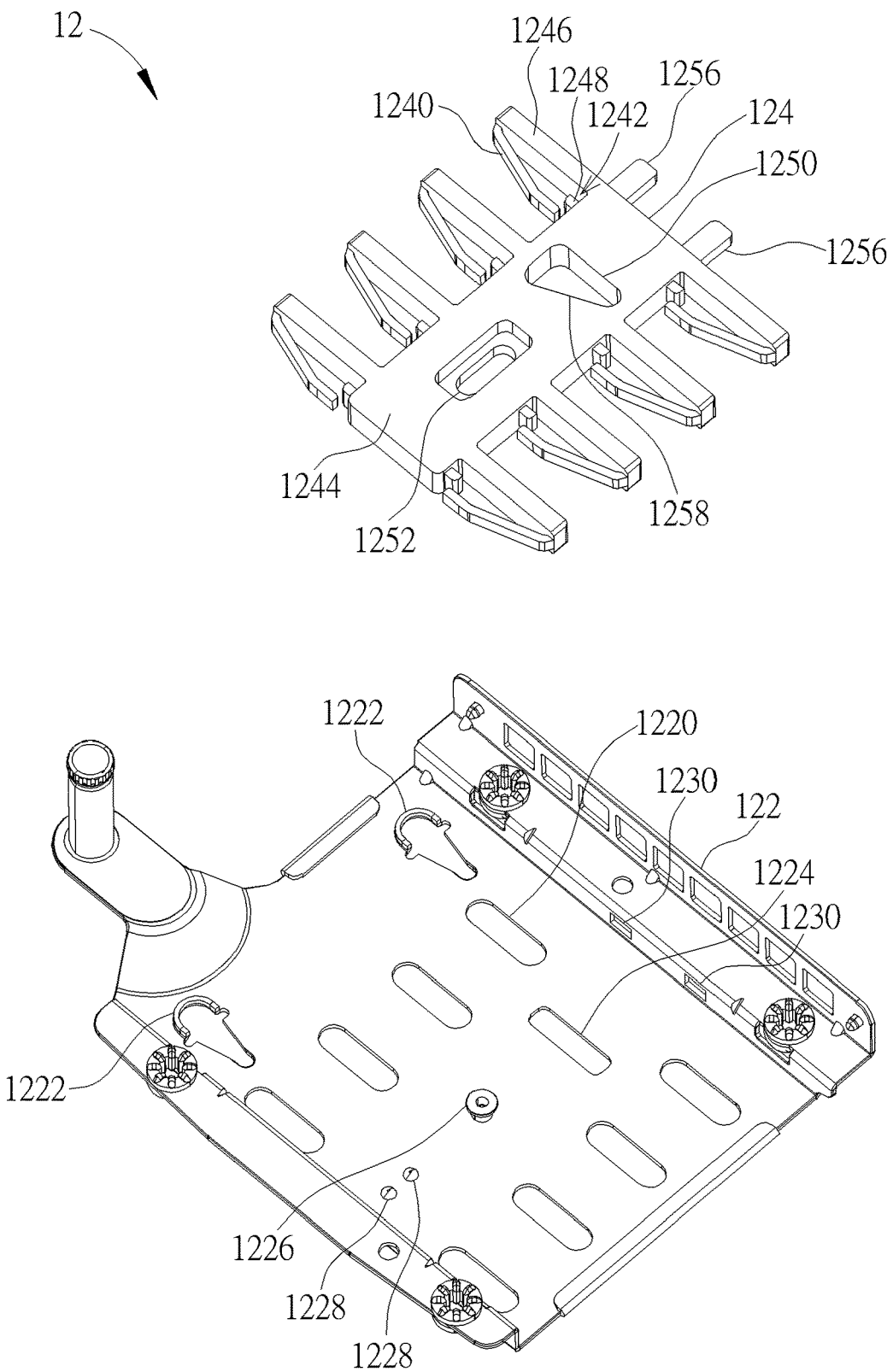
FIG. 4 is an exploded view illustrating the tray and the recognition mechanism shown in FIG. 3.
Figure 5:
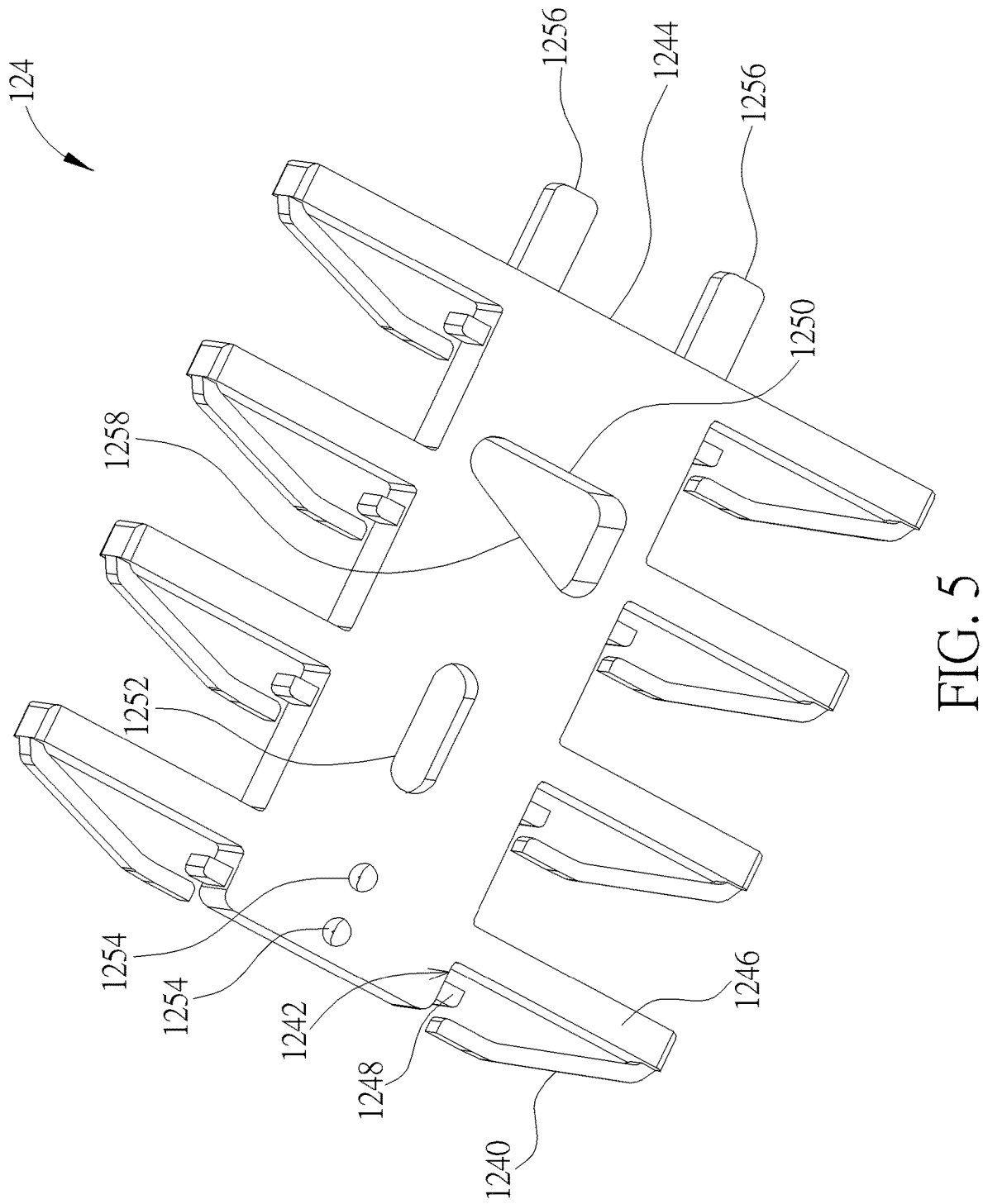
FIG. 5 is a perspective view illustrating the recognition mechanism shown in FIG. 3 from another viewing angle.
Figure 6:
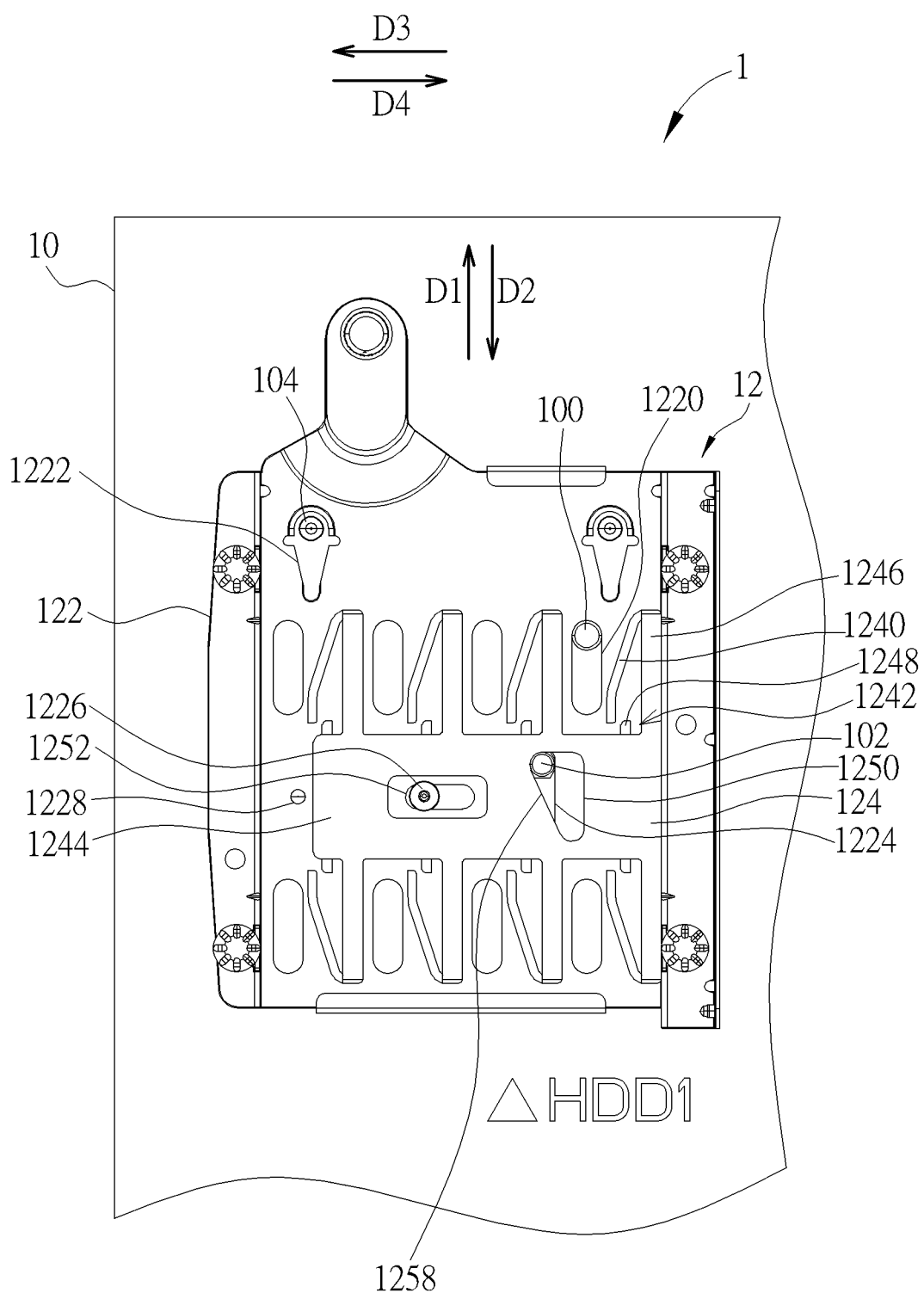
FIG. 6 is a top view illustrating the tray shown in FIG. 3 being disposed on the base plate.
Figure 7:
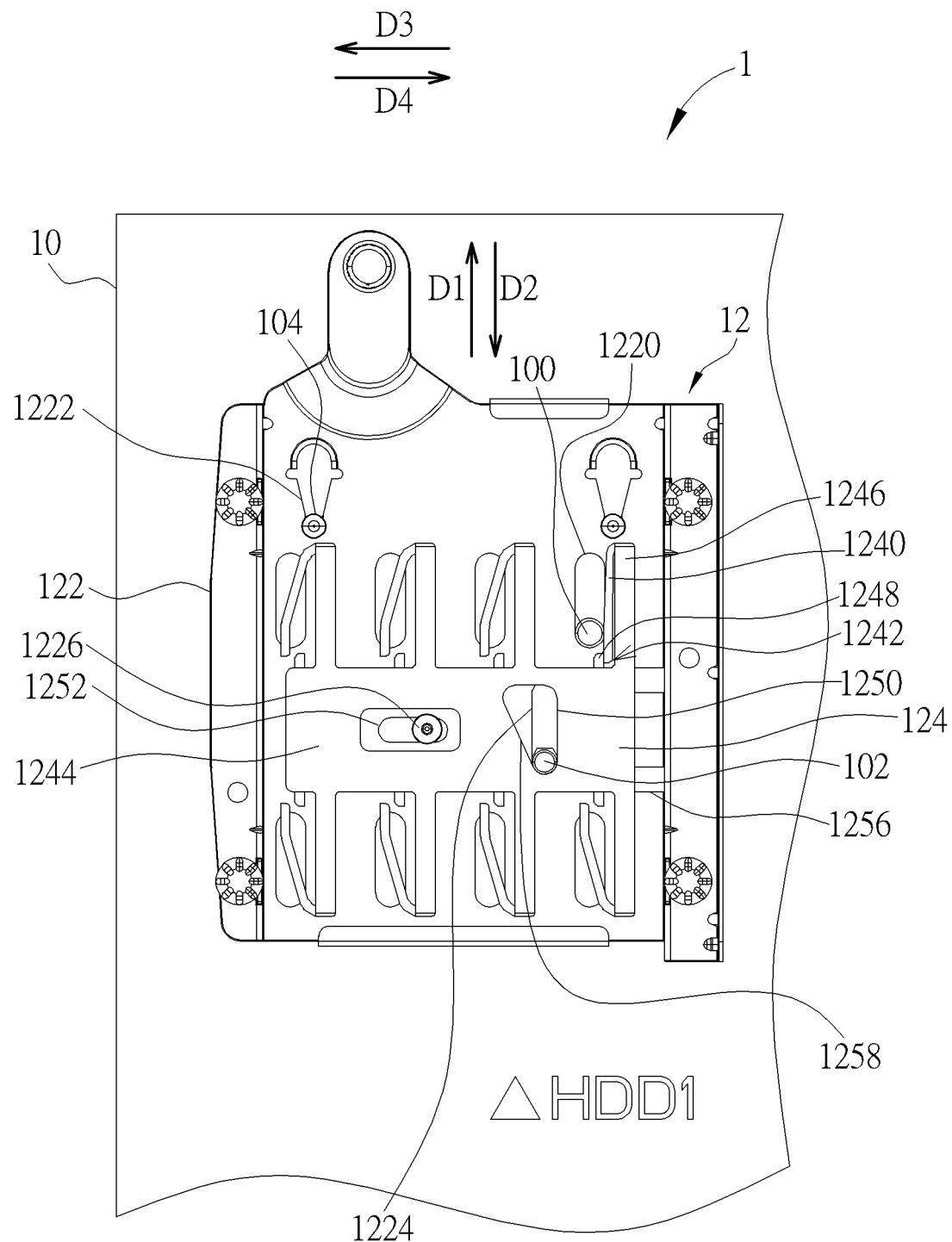
FIG. 7 is a top view illustrating the tray shown in FIG. 6 moving with respect to the base plate.
Figure 8:
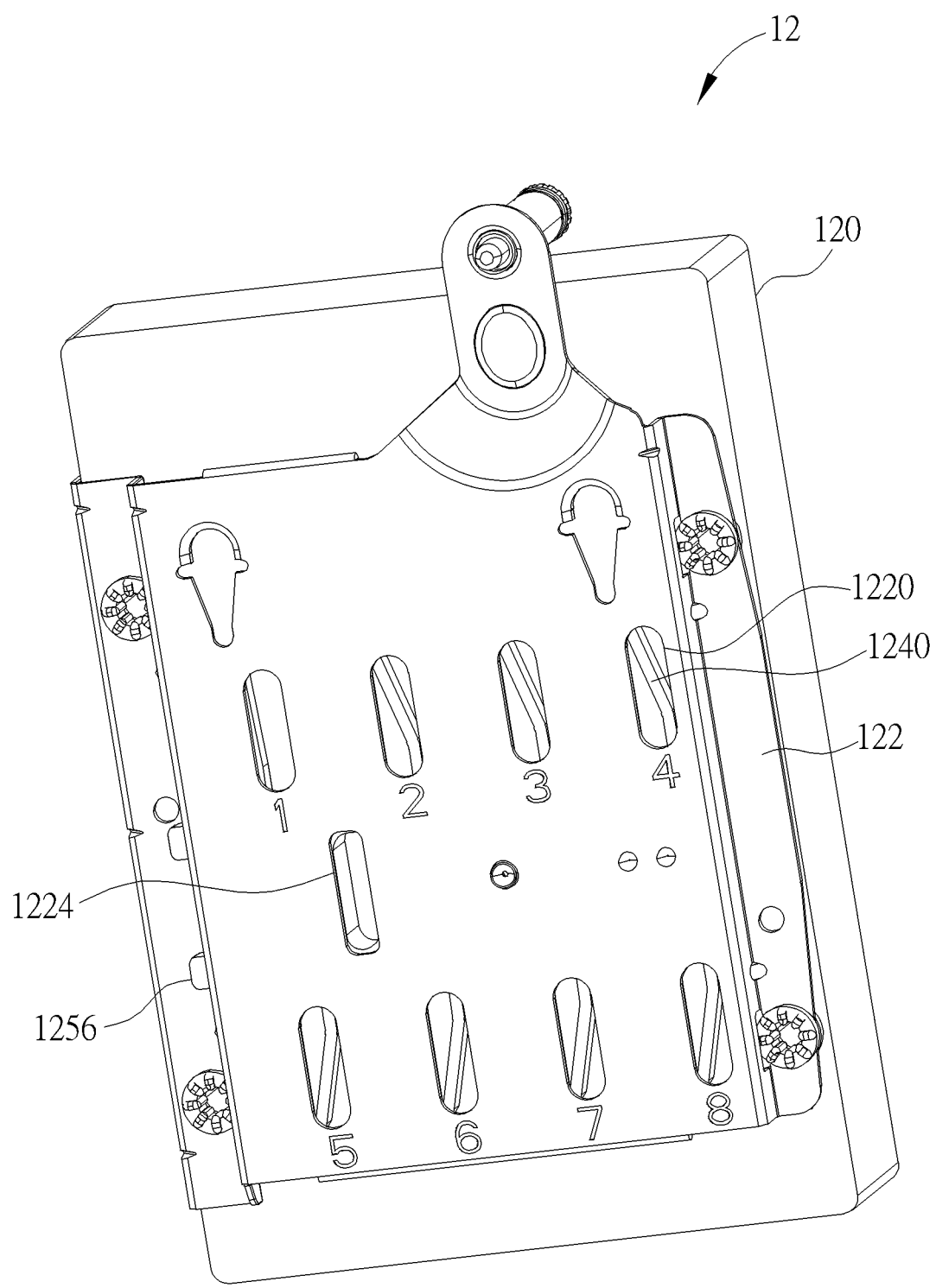
FIG. 8 is a perspective view illustrating an electronic module.
Figure 9:
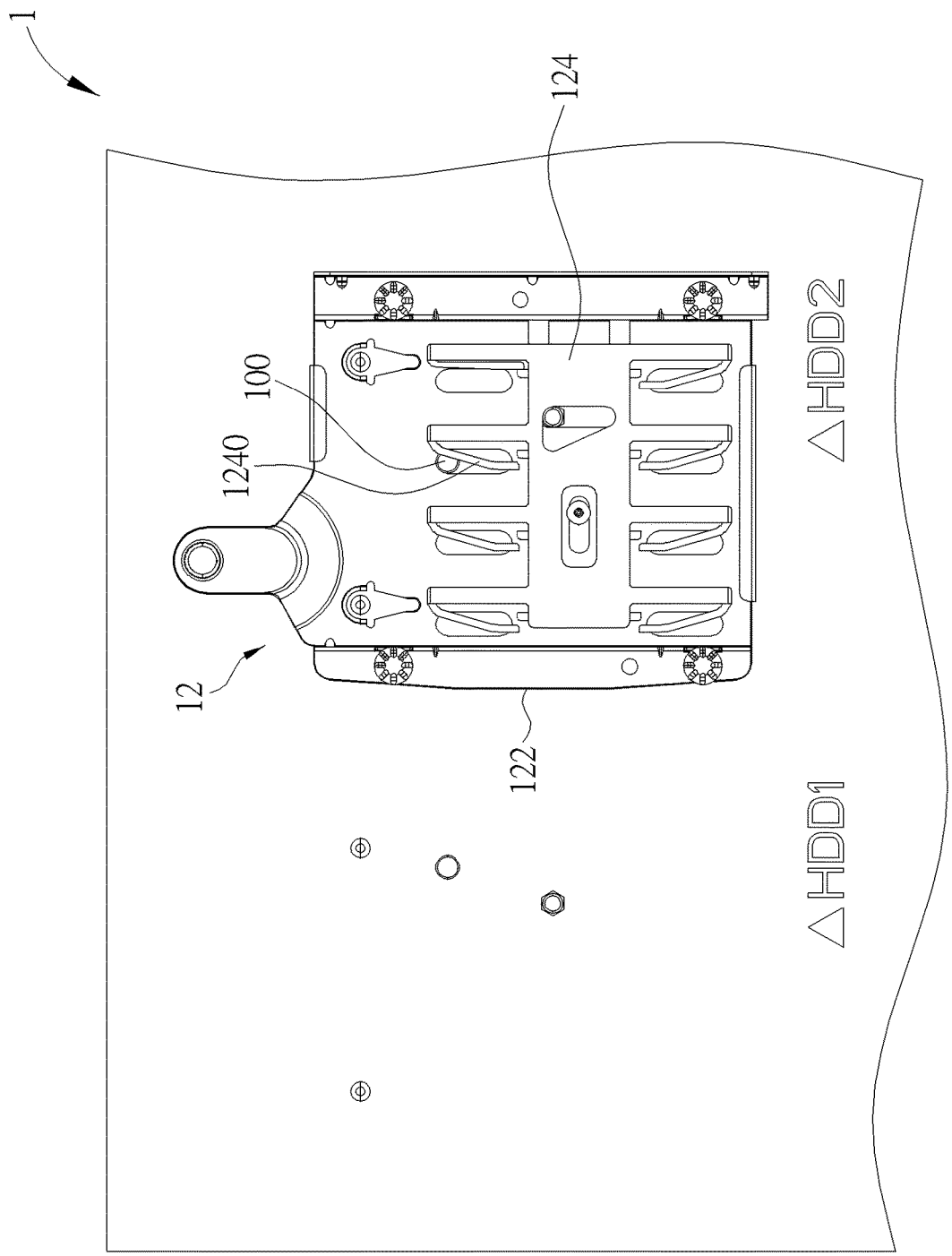
FIG. 9 is a top view illustrating the tray and the recognition mechanism shown in FIG. 7 being disposed on the base plate.
Figure 10:
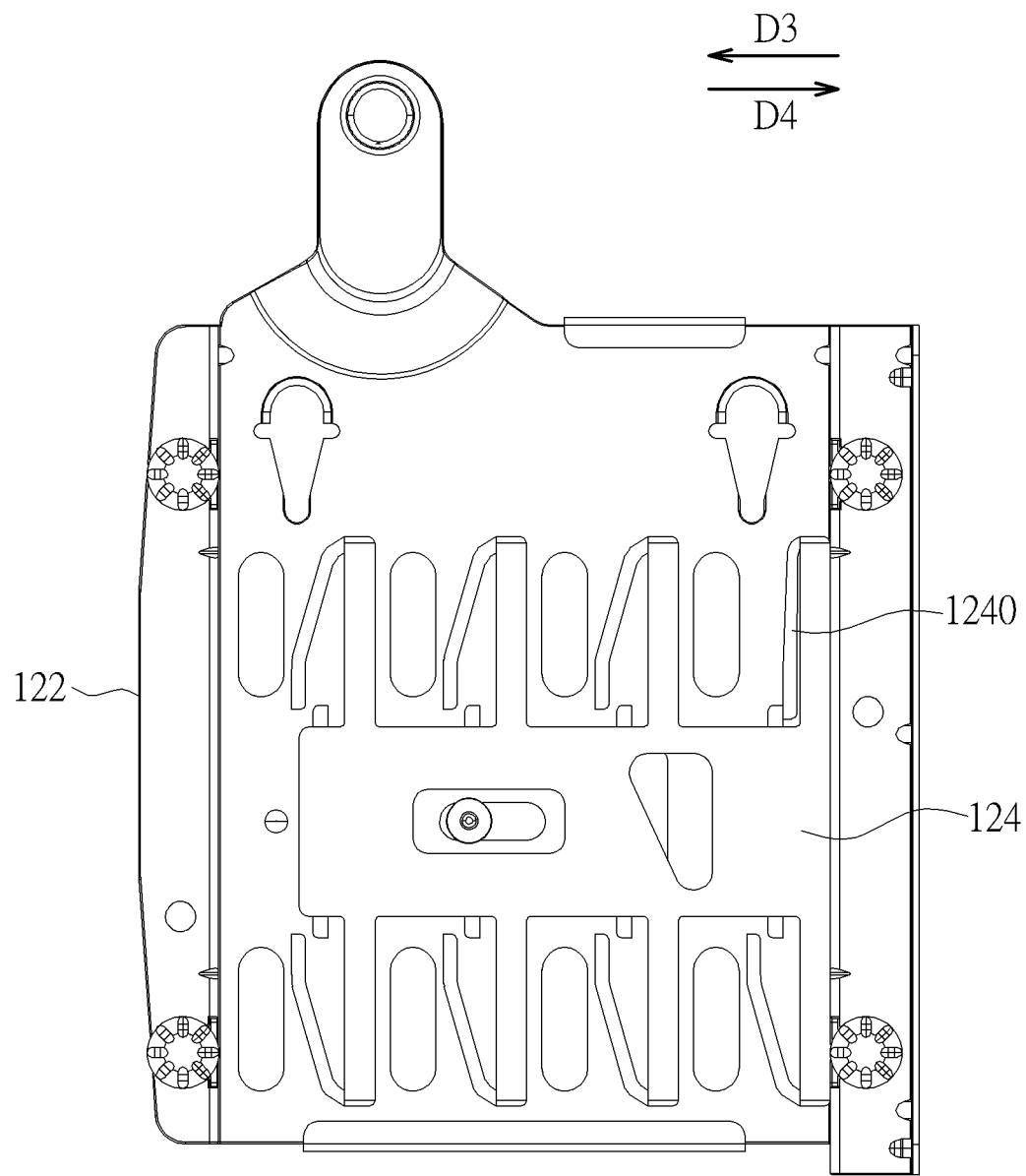
FIG. 10 is a top view illustrating the tray shown in FIG. 7 being detached from the base plate and the recognition mechanism moving toward a fourth direction.

Referring to FIGS. 1 to 10, FIG. 1 is a perspective view illustrating a data processing device 1 according to an embodiment of the invention, FIG. 2 is a perspective view illustrating a base plate 10 shown in FIG. 1, FIG. 3 is a perspective view illustrating a tray 122 and a recognition mechanism 124 according to an embodiment of the invention, FIG. 4 is an exploded view illustrating the tray 122 and the recognition mechanism 124 shown in FIG. 3, FIG. 5 is a perspective view illustrating the recognition mechanism 124 shown in FIG. 3 from another viewing angle, FIG. 6 is a top view illustrating the tray 122 shown in FIG. 3 being disposed on the base plate 10, FIG. 7 is a top view illustrating the tray 122 shown in FIG. 6 moving with respect to the base plate 10, FIG. 8 is a perspective view illustrating an electronic module 12, FIG. 9 is a top view illustrating the tray 122 and the recognition mechanism 124 shown in FIG. 7 being disposed on the base plate 10, and FIG. 10 is a top view illustrating the tray 122 shown in FIG. 7 being detached from the base plate 10 and the recognition mechanism 124 moving toward a fourth direction D4.

As shown in FIGS. 1 to 5, the data processing device 1 comprises a base plate 10 and an electronic module 12. The base plate 10 comprises N driving portions 100, N actuating portions 102 and 2N positioning portions 104, wherein N is a positive integer larger than 1. In this embodiment, N is equal to 8, but the invention is not so limited. In this embodiment, the base plate 10 may have eight installation regions HDD1-HDD8. Eight driving portions 100, eight actuating portions 102 and sixteen positioning portions 104 are respectively disposed in the eight installation regions HDD1-HDD8. That is to say, each of the installation regions HDD1-HDD8 comprises one driving portion 100, one actuating portion 102 and two positioning portions 104. Furthermore, in the following, the component located in the first installation region HDD1 is defined as the first component, the component located in the second installation region HDD2 is defined as the second component, and so on.

The electronic module 12 comprises an electronic component 120, a tray 122 and a recognition mechanism 124. In this embodiment, the electronic component 120 may be, but is not limited to, a hard disk. In practical applications, eight electronic modules 12 may be installed on the eight installation regions HDD1-HDD8 of the base plate 10, so as to form storage equipment for storing a large amount of data. The tray 122 is configured to support the electronic component 120. In this embodiment, the electronic component 120 may be fixed on the tray 122 by screws or other fixing members according to practical applications.

The tray 122 comprises N slots 1220 and two positioning grooves 1222, wherein positions of the N slots 1220 respectively correspond to positions of the N driving portions 100, and the two positioning grooves 1222 respectively correspond to two positioning portions 104 of each installation regions HDD1-HDD8. In this embodiment, N is equal to 8. Thus, the tray 122 may comprise eight slots 1220. For further explanation, when the tray 122 is installed on one of the eight installation regions HDD1-HDD8, the two positioning portions 104 will be disposed in the two positioning grooves 1222 correspondingly, and the driving portion 100 will be disposed in one of the eight slots 1220 correspondingly. Furthermore, the tray 122 further comprises a through hole 1224, a guiding portion 1226, two first restraining portions 1228 and two insertion holes 1230. In this embodiment, the slots 1220, the positioning grooves 1222, the through hole 1224, the guiding portion 1226 and the first restraining portions 1228 may be located at a bottom of the tray 122, and the insertion holes 1230 may be located at a side wall of the tray 122.

The recognition mechanism 124 is disposed on the tray 122. The recognition mechanism 124 comprises N interfering portions 1240 and N receiving recesses 1242, wherein positions of the N interfering portions 1240 respectively correspond to positions of the N slots 1220, and positions of the N receiving recesses 1242 respectively correspond to positions of the N interfering portions 1240. In this embodiment, the recognition mechanism 124 may further comprise a sliding body 1244, N extending portions 1246 and N protruding portions 1248, wherein the N extending portions 1246 respectively extend from opposite sides of the sliding body 1244, the N interfering portions 1240 are elastic arms respectively extending from ends of the N extending portions 1246, the N protruding portions 1248 respectively protrude from opposite sides of the sliding body 1244, and each of the N receiving recesses 1242 is correspondingly located between each of the N protruding portions 1248 and each of the N extending portions 1246. In this embodiment, N is equal to 8. Thus, the recognition mechanism 124 may comprise eight interfering portions 1240, eight receiving recesses 1242, eight extending portions 1246 and eight protruding portions 1248. Still further, the sliding body 1244 may comprise an actuating groove 1250, a guiding groove 1252, two second restraining portions 1254 and two insertion portions 1256.

The two insertion portions 1256 of the recognition mechanism 124 are disposed in the two insertion holes 1230 of the tray 122, and the guiding portion 1226 of the tray 122 is disposed in the guiding groove 1252 of the recognition mechanism 124, such that the recognition mechanism 124 is movably disposed on the tray 122. As shown in FIGS. 6 and 7, the recognition mechanism 124 may move with respect to the tray 122 toward a third direction D3 or a fourth direction D4, wherein the third direction D3 is opposite to the fourth direction D4. When the recognition mechanism 124 is disposed on the tray 122, the two first restraining portions 1228 may cooperate with the two second restraining portions 1254 to restrain the sliding body 1244 from moving. When the recognition mechanism 124 is located at the position shown in FIG. 6, one of the two first restraining portions 1228 engages with one of the two second restraining portions 1254 to restrain the recognition mechanism 124 on the tray 122. When the recognition mechanism 124 is located at the position shown in FIG. 7, the two first restraining portions 1228 engage with the two second restraining portions 1254 to restrain the recognition mechanism 124 on the tray 122. In this embodiment, one of the first restraining portion 1228 and the second restraining portion 1254 may be a protrusion and the other one of the first restraining portion 1228 and the second restraining portion 1254 may be a hole.

The recognition mechanism 124 may be disposed on the tray 122 first, as shown in FIG. 3. Then, a user may fix the electronic component 120 on the tray 122 and dispose the tray 122 on the base plate 10. In this embodiment, the tray 122 is movably disposed on the base plate 10, such that an i-th driving portion 100 of the N driving portions 100 is disposed in an i-th slot 1220 of the N slots 1220, wherein i is a positive integer smaller than or equal to N. In this embodiment, N is equal to 8. Thus, i may be any positive integer from 1 to 8. When the tray 122 moves with respect to the base plate 10 toward a first direction D1, the i-th driving portion 100 moves within the i-th slot 1220 toward a second direction D2 to push an i-th interfering portion 1240 of the N interfering portions 1240 to move, such that the i-th interfering portion 1240 extends into an i-th receiving recess 1242 of the N receiving recesses 1242, wherein the first direction D1 is opposite to the second direction D2.

It should be noted that, in order to clearly show the movement of the tray 122 and the recognition mechanism 124 with respect to the base plate 10, the electronic component 120 shown in FIG. 1 is omitted in FIGS. 6 and 7. As shown in FIG. 6, when the tray 122 is disposed on the first installation region HDD1 of the base plate 10, the first driving portion 100 of the first installation region HDD1 is correspondingly disposed in the first slot 1220, and the two positioning portions 104 of the first installation region HDD1 are correspondingly disposed in the two positioning grooves 1222. At the same time, the actuating portion 102 of the first installation region HDD1 is disposed in the actuating groove 1250 of the recognition mechanism 124 through the through hole 1224 of the tray 122. In this embodiment, the actuating groove 1250 has an inclined surface 1258 and the actuating portion 102 abuts against an end of the inclined surface 1258.

Then, the user may operate the tray 122 to move toward the first direction D1. When the tray 122 moves with respect to the base plate 10 toward the first direction D1, the actuating portion 102 of the base plate 10 pushes the inclined surface 1258 of the actuating groove 1250 to drive the sliding body 1244 to move toward the third direction D3, and the first driving portion 100 moves within the first slot 1220 toward the second direction D2 to push the first interfering portion 1240 to move, such that the first interfering portion 1240 extends into the first receiving recess 1242, as shown in FIG. 7. At the same time, a connector of the electronic component 120 shown in FIG. 1 is connected to a connector of a circuit board (not shown) in the data processing device 1. Accordingly, the electronic module 12 may be easily installed on any of the installation regions HDD1-HDD8 of the base plate 10.

In this embodiment, the third direction D3 is perpendicular to the first direction D1. That is to say, a moving direction of the sliding body 1244 of the recognition mechanism 124 is perpendicular to a moving direction of the tray 122. In this embodiment, extending directions of the two positioning grooves 1222 and an extending direction of each slot 1220 are parallel to the first direction D1 and the second direction D2, so as to ensure that the tray 122 moves linearly along the first direction D1 and the second direction D2. Furthermore, an extending direction of the guiding groove 1252 of the recognition mechanism 124 is perpendicular to the first direction D1, so as to ensure that the sliding body 1244 of the recognition mechanism 124 moves linearly along the third direction D3.

When the electronic component 120 needs to be replaced or repaired, the user may operate the tray 122 to move toward the second direction D2 to detach the electronic module 12 from the base plate 10. After the electronic component 120 is replaced or repaired, the user may install the electronic module 12 on the first installation region HDD1 of the base plate 10. As shown in FIG. 7, when the first interfering portion 1240 extends into the first receiving recess 1242, the other seven interfering portions 1240 respectively overlap with the other seven slots 1220 at positions corresponding to the other seven driving portions 100 of the installation regions HDD2-HDD8. Thus, as shown in FIG. 8, even if the electronic component 120 is not detached from the tray 122, the user can still view the overlapping condition between the interfering portion 1240 and the slot 1220 from the back of the tray 122, thereby easily recognizing which installation region the electronic module 12 is installed on the base plate 10. Accordingly, the recognition mechanism 124 is able to mark the electronic component 120 during installation, so as to achieve the function of recognition, reduce additional marking man-hours, and reduce labor cost.

Furthermore, if the user installs the electronic module 12 on the wrong position (e.g. the second installation region HDD2 shown in FIG. 9), the second interfering portion 1240 of the recognition mechanism 124 will interfere with the second driving portion 100 of the second installation region HDD2, such that the electronic module 12 cannot be installed on the wrong position. Accordingly, the recognition mechanism 124 is able to achieve the function of foolproof, reduce the time of wrong disassembly and assembly, and increase the average life of the device.

Moreover, the marked recognition mechanism 124 shown in FIG. 7 may be recovered for use by another electronic component. As shown in FIG. 10, the user may detach the tray 122 from the base plate 10 and operate the recognition mechanism 124 to move toward the fourth direction D4. Then, the user may manually pull back the first interfering portion 1240 toward the third direction D3, such that the recognition mechanism 124 can return to the unmarked state shown in FIG. 6.

Figure 11:
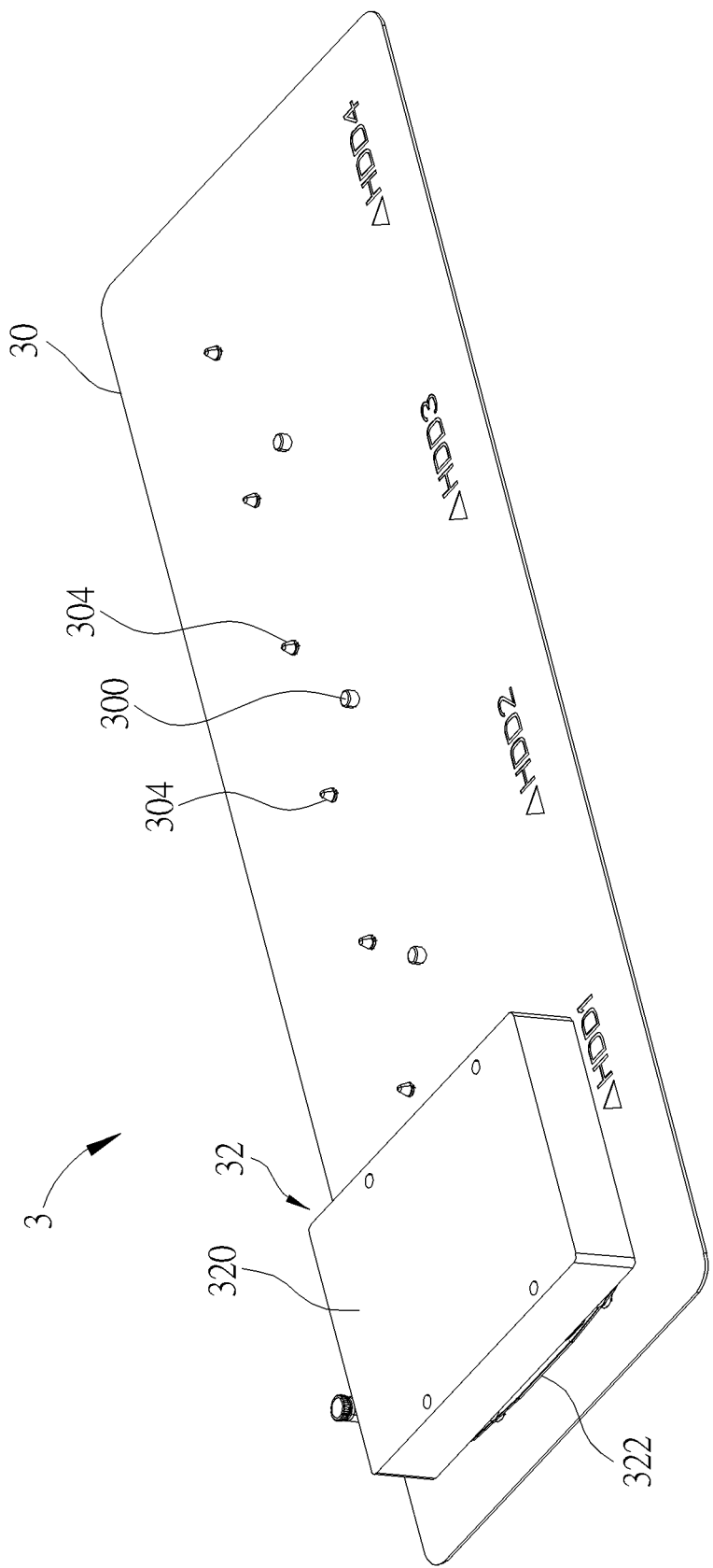
FIG. 11 is a perspective view illustrating a data processing device according to another embodiment of the invention.
Figure 12:
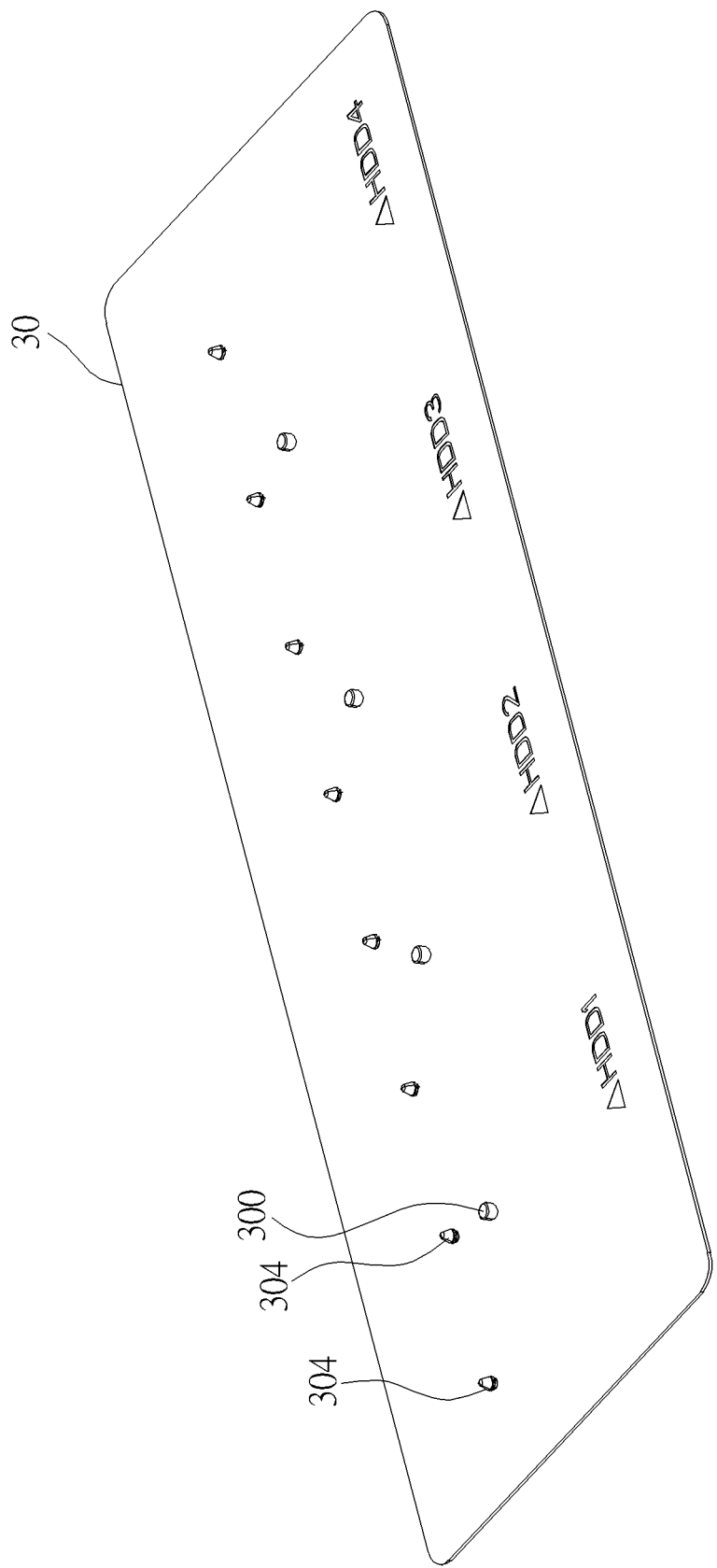
FIG. 12 is a perspective view illustrating a base plate shown in FIG. 11.
Figure 13:
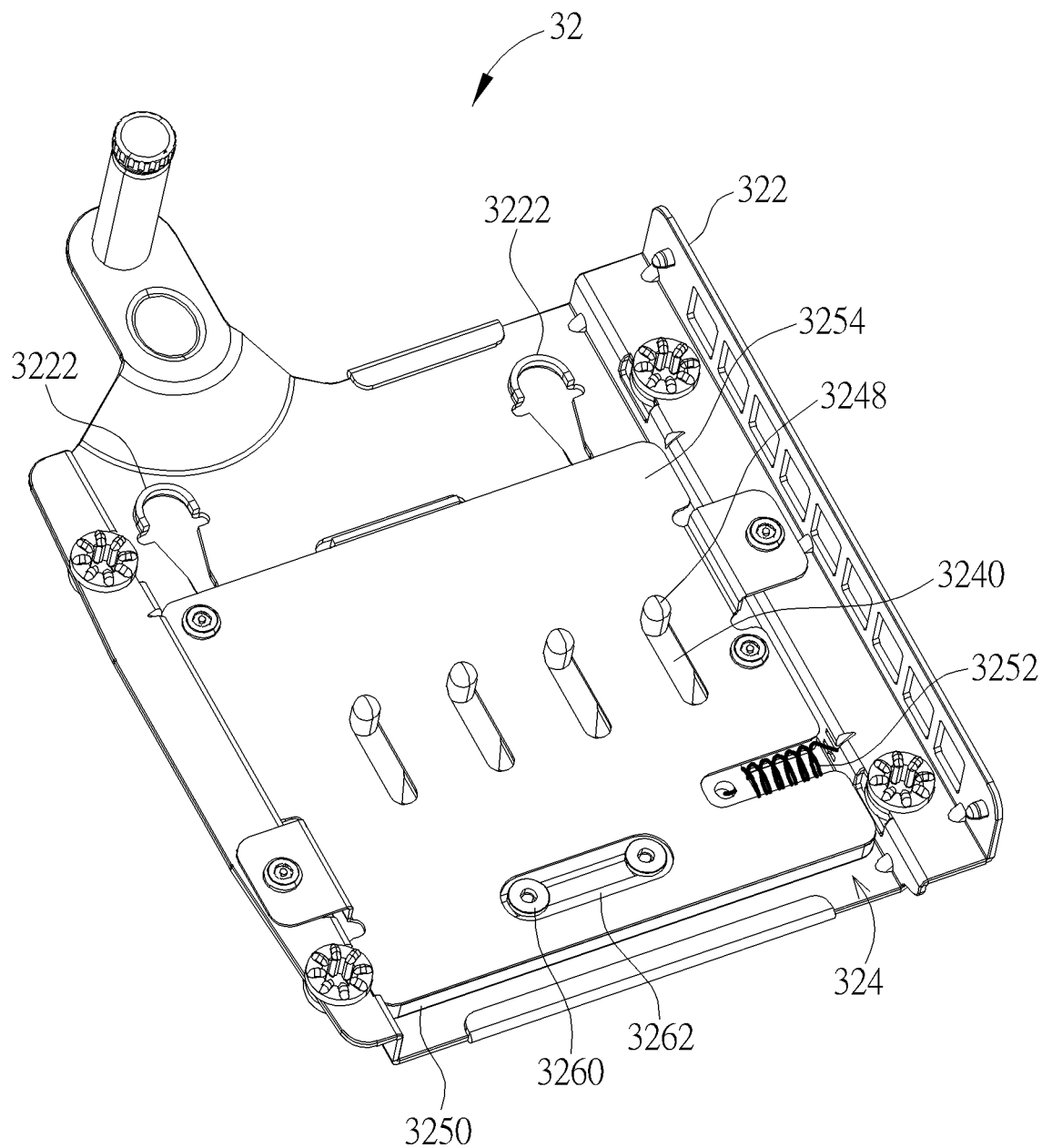
FIG. 13 is a perspective view illustrating a tray and a recognition mechanism according to another embodiment of the invention.
Figure 14:
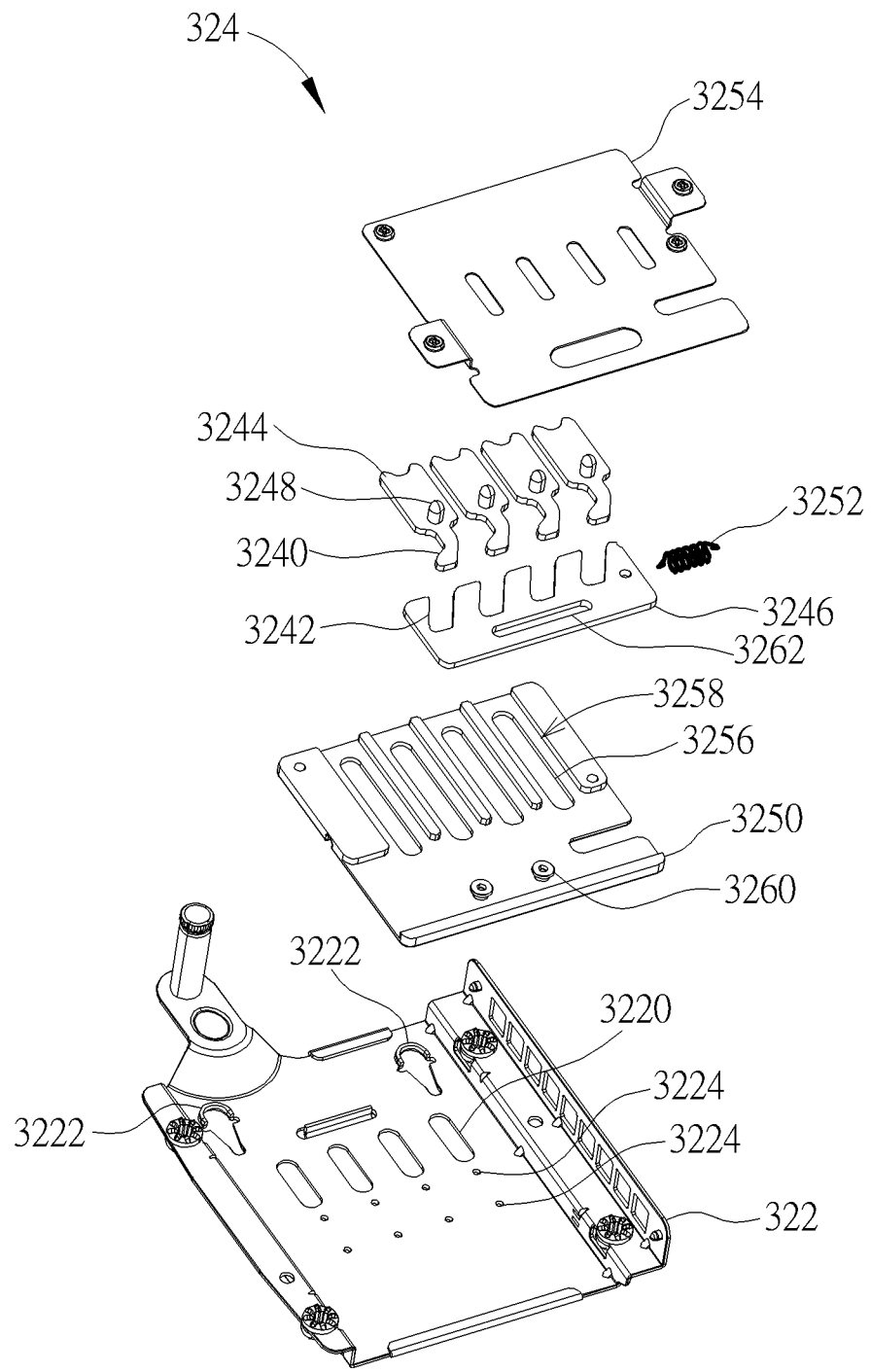
FIG. 14 is an exploded view illustrating the tray and the recognition mechanism shown in FIG. 13.
Figure 15:
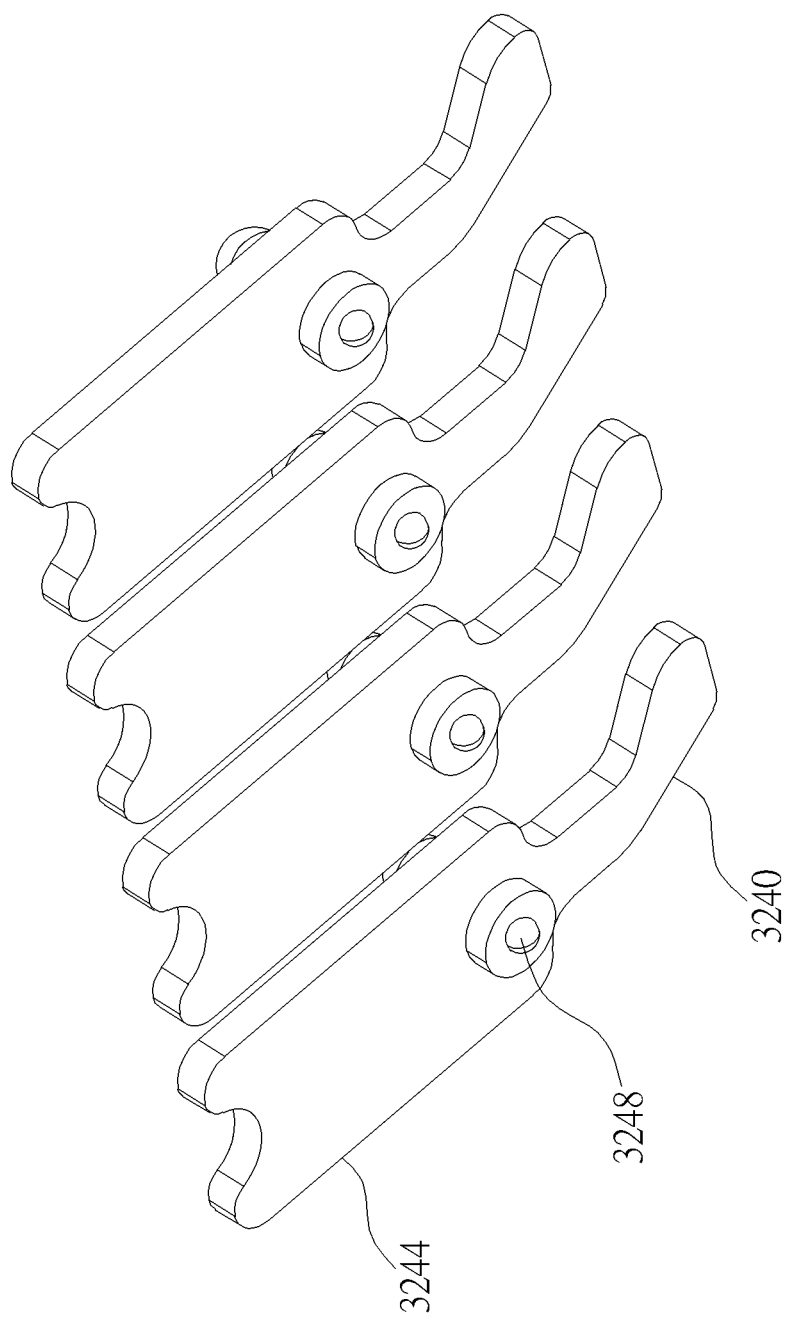
FIG. 15 is a perspective view illustrating the first sliding members shown in FIG. 14 from another viewing angle.
Figure 16:
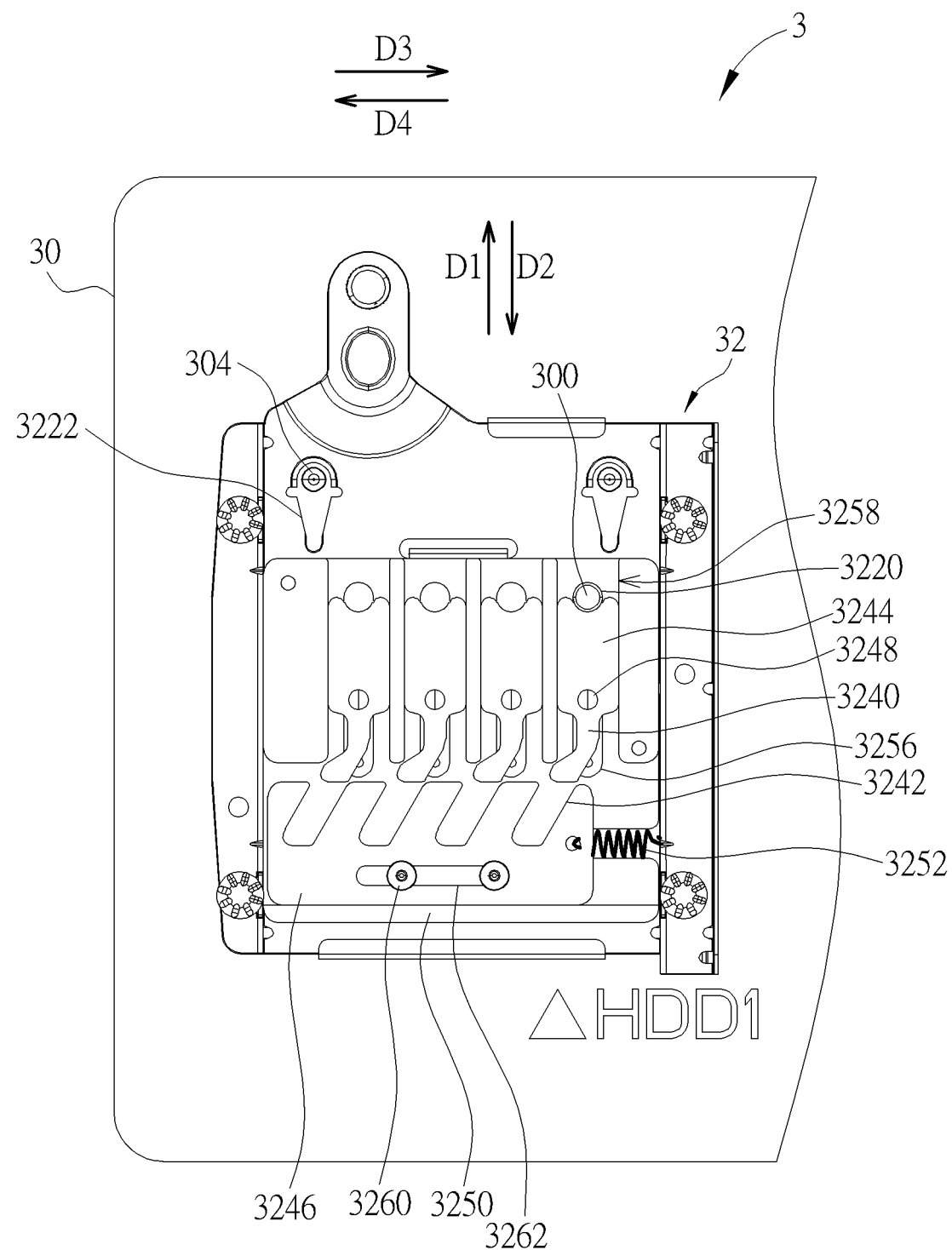
FIG. 16 is a top view illustrating the tray shown in FIG. 13 being disposed on the base plate without the cover.
Figure 17:
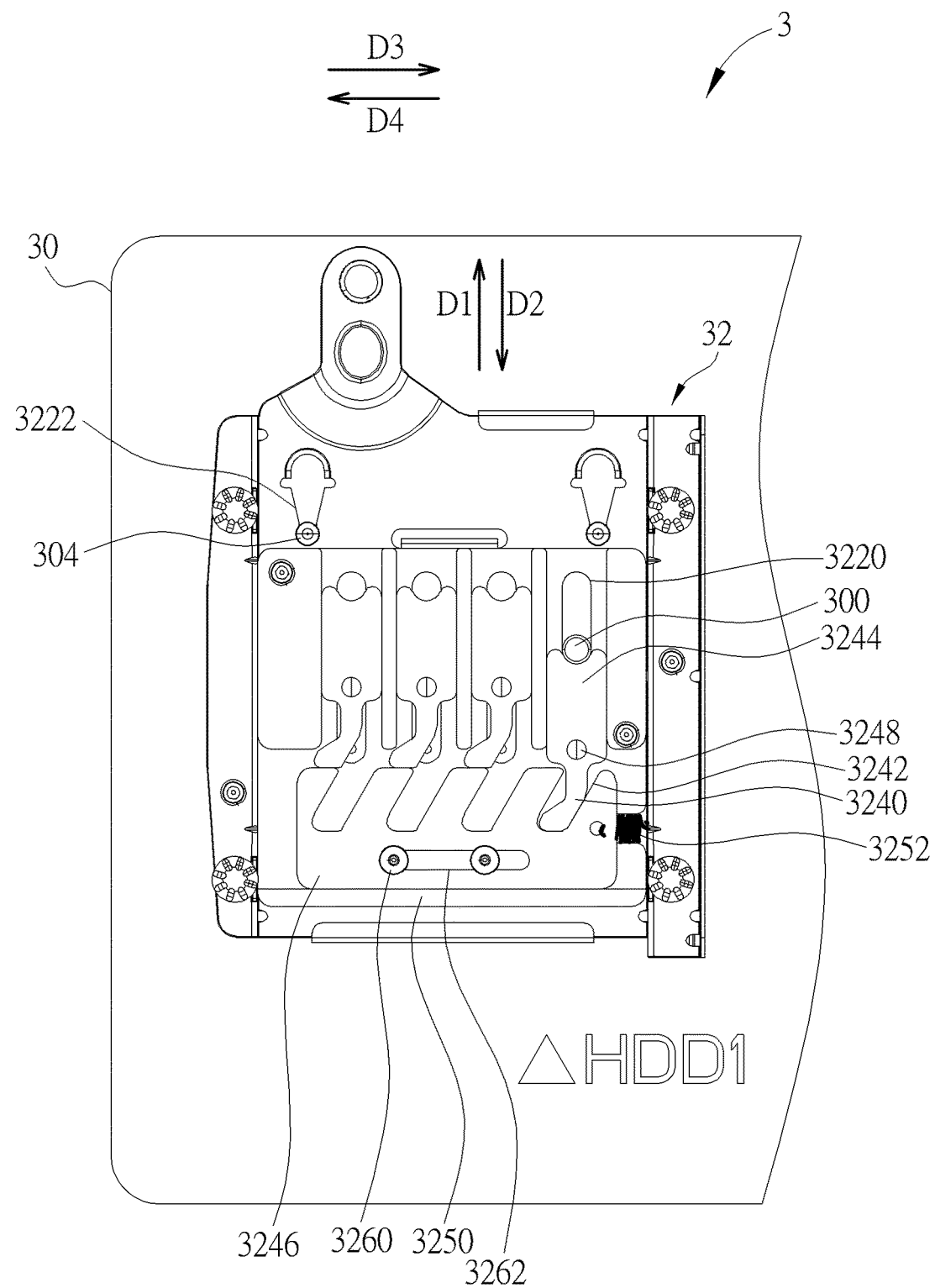
FIG. 17 is a top view illustrating the tray shown in FIG. 16 moving with respect to the base plate.
Figure 18:
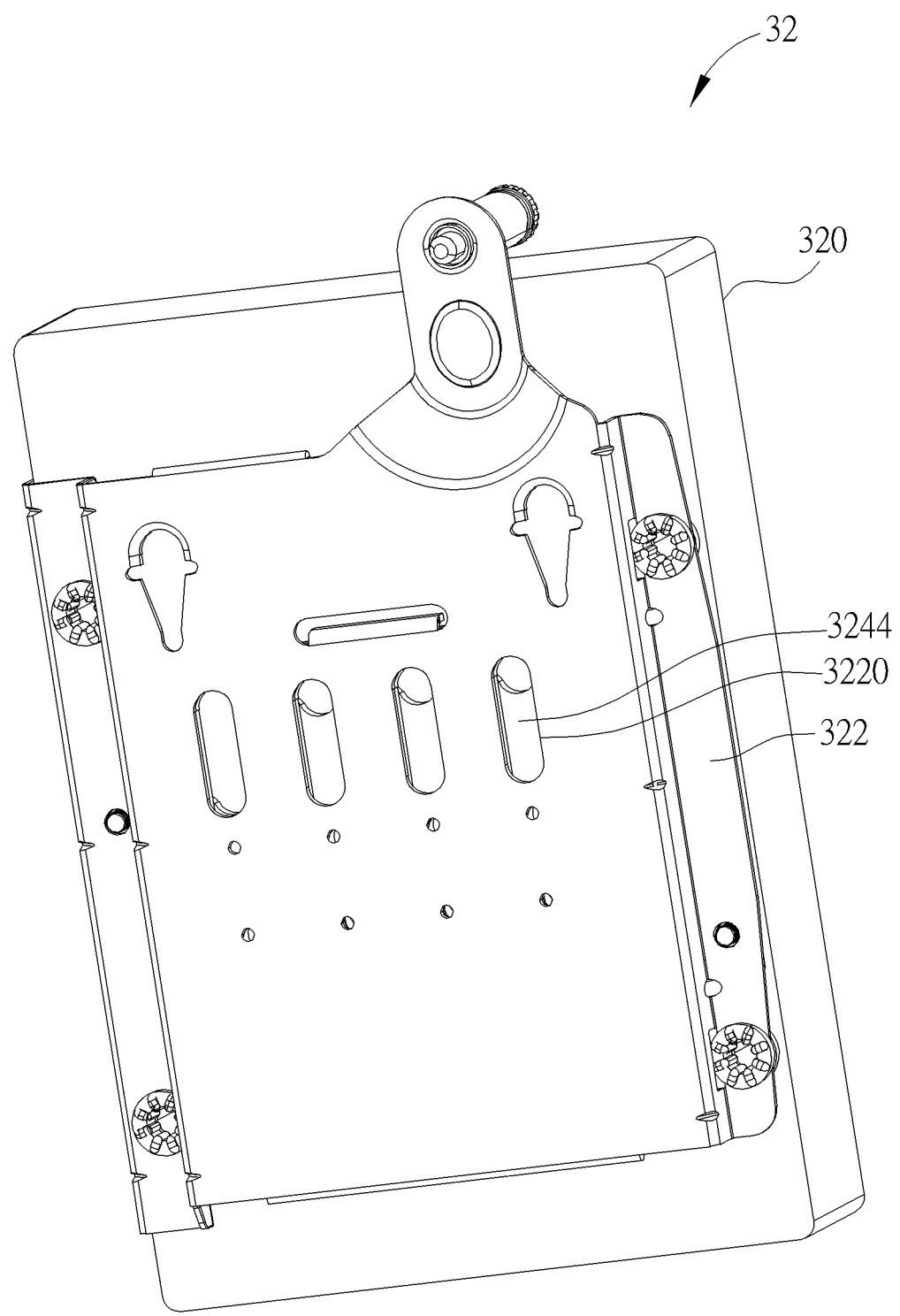
FIG. 18 is a perspective view illustrating an electronic module.
Figure 19:
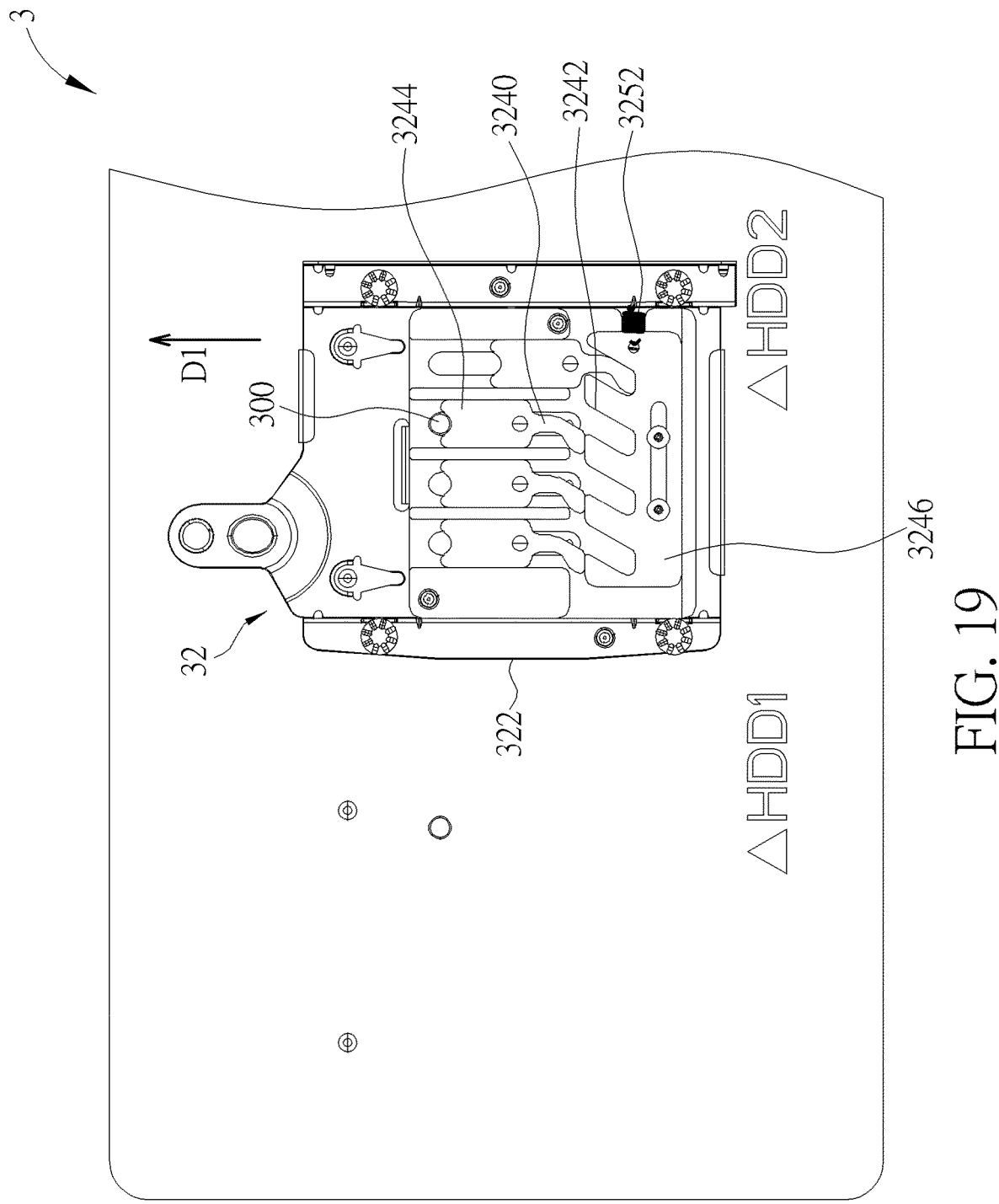
FIG. 19 is a top view illustrating the tray and the recognition mechanism shown in FIG. 17 being disposed on the base plate.

Referring to FIGS. 11 to 19, FIG. 11 is a perspective view illustrating a data processing device 3 according to another embodiment of the invention, FIG. 12 is a perspective view illustrating a base plate 30 shown in FIG. 11, FIG. 13 is a perspective view illustrating a tray 322 and a recognition mechanism 324 according to another embodiment of the invention, FIG. 14 is an exploded view illustrating the tray 322 and the recognition mechanism 324 shown in FIG. 13, FIG. 15 is a perspective view illustrating the first sliding members 3244 shown in FIG. 14 from another viewing angle, FIG. 16 is a top view illustrating the tray 322 shown in FIG. 13 being disposed on the base plate 30 without the cover 3254, FIG. 17 is a top view illustrating the tray 322 shown in FIG. 16 moving with respect to the base plate 30, FIG. 18 is a perspective view illustrating an electronic module 32, and FIG. 19 is a top view illustrating the tray 322 and the recognition mechanism 324 shown in FIG. 17 being disposed on the base plate 30.

As shown in FIGS. 11 to 15, the data processing device 3 comprises a base plate 30 and an electronic module 32. The base plate 30 comprises N driving portions 300 and 2N positioning portions 304, wherein N is a positive integer larger than 1. In this embodiment, N is equal to 4, but the invention is not so limited. In this embodiment, the base plate 30 may have four installation regions HDD1-HDD4, and four driving portions 300 and eight positioning portions 304 are respectively disposed in the four installation regions HDD1-HDD4. That is to say, each of the installation regions HDD1-HDD4 comprises one driving portion 300 and two positioning portions 304. Furthermore, in the following, the component located in the first installation region HDD1 is defined as the first component, the component located in the second installation region HDD2 is defined as the second component, and so on.

The electronic module 32 comprises an electronic component 320, a tray 322 and a recognition mechanism 324. In this embodiment, the electronic component 320 may be, but is not limited to, a hard disk. In practical applications, four electronic modules 32 may be installed on the four installation regions HDD1-HDD4 of the base plate 30, so as to form storage equipment for storing a large amount of data. The tray 322 is configured to support the electronic component 320. In this embodiment, the electronic component 320 may be fixed on the tray 322 by screws or other fixing members according to practical applications.

The tray 322 comprises N slots 3220, two positioning grooves 3222 and 2N restraining portions 3224, wherein positions of the N slots 3220 respectively correspond to positions of the N driving portions 300, the two positioning grooves 3222 respectively correspond to two positioning portions 304 of each installation regions HDD1-HDD4, and positions of the 2N restraining portions 3224 respectively correspond to positions of the N slots 3220. In this embodiment, N is equal to 4. Thus, the tray 322 may comprise four slots 3220 and eight restraining portions 3224. For further explanation, when the tray 322 is installed on one of the four installation regions HDD1-HDD4, the two positioning portions 304 will be disposed in the two positioning grooves 3222 correspondingly, and the driving portion 300 will be disposed in one of the four slots 3220 correspondingly.

The recognition mechanism 324 is disposed on the tray 322. The recognition mechanism 324 comprises N interfering portions 3240 and N receiving recesses 3242, wherein positions of the N interfering portions 3240 respectively correspond to positions of the N slots 3220, and positions of the N receiving recesses 3242 respectively correspond to positions of the N interfering portions 3240. In this embodiment, the recognition mechanism 324 may further comprise N first sliding members 3244 and a second sliding member 3246, wherein the N interfering portions 3240 are respectively located on the N first sliding members 3244, and the second sliding member 3246 has the N receiving recesses 3242. In this embodiment, the N receiving recesses 3242 are inclined recesses and the N interfering portions 3240 are respectively inclined toward the N receiving recesses 3242. In this embodiment, N is equal to 4. Thus, the recognition mechanism 324 may comprise four interfering portions 3240, four receiving recesses 3242 and four first sliding members 3244.

Furthermore, the recognition mechanism 324 may further comprise N restraining members 3248, wherein the N restraining members 3248 are respectively disposed on the N interfering portions 3240. When the recognition mechanism 324 is disposed on the tray 322, the N restraining members 3248 may cooperate with the 2N restraining portions 3224 to restrain the N first sliding members 3244 from moving. In this embodiment, N is equal to 4. Thus, the recognition mechanism 324 may comprise four restraining members 3248. When the first sliding member 3244 on the far right is located at the position shown in FIG. 16, the restraining member 3248 engages with one of the two restraining portions 3224 to restrain the first sliding member 3244 on the tray 322. When the first sliding member 3244 on the far right is located at the position shown in FIG. 17, the restraining member 3248 engages with the other one of the two restraining portions 3224 to restrain the first sliding member 3244 on the tray 322. In this embodiment, the restraining member 3248 may be a ball pin and the restraining portion 3224 may be a hole.

Moreover, the recognition mechanism 324 may further comprise a substrate 3250, an elastic member 3252 and a cover 3254. The substrate 3250 is disposed on the tray 322. The substrate 3250 has N avoidance recesses 3256 and N tracks 3258, wherein the N avoidance recesses 3256 are disposed with respect to the N tracks 3258 and aligned with the N slots 3220. The N first sliding members 3244 are respectively disposed in the N tracks 3258, such that each first sliding member 3244 may slide along the corresponding track 3258 between the positions shown in FIGS. 16 and 17. The restraining member 3248 may pass through the avoidance recess 3256 to engage with one of the two restraining portions 3224. In this embodiment, N is equal to 4. Thus, the substrate 3250 may have four avoidance recesses 3256 and four tracks 3258. Opposite ends of the elastic member 3252 are respectively connected to the second sliding member 3246 and the tray 322. In this embodiment, the elastic member 3252 may be, but is not limited to, a spring. The cover 3254 is disposed on the tray 322 and covers the N first sliding members 3244, the second sliding member 3246 and the substrate 3250.

The recognition mechanism 324 may be disposed on the tray 322 first, as shown in FIG. 13. Then, a user may fix the electronic component 320 on the tray 322 and dispose the tray 322 on the base plate 30. In this embodiment, the tray 322 is movably disposed on the base plate 30, such that an i-th driving portion 300 of the N driving portions 300 is disposed in an i-th slot 3220 of the N slots 3220, wherein i is a positive integer smaller than or equal to N. In this embodiment, N is equal to 4. Thus, i may be any positive integer from 1 to 4. When the tray 322 moves with respect to the base plate 30 toward a first direction D1, the i-th driving portion 300 moves within the i-th slot 3220 toward a second direction D2 to push an i-th interfering portion 3240 of the N interfering portions 3240 to move, such that the i-th interfering portion 3240 extends into an i-th receiving recess 3242 of the N receiving recesses 3242, wherein the first direction D1 is opposite to the second direction D2.

It should be noted that, in order to clearly show the movement of the tray 322 and the recognition mechanism 324 with respect to the base plate 30, the electronic component 320 shown in FIG. 11 is omitted in FIGS. 16 and 17. As shown in FIG. 16, when the tray 322 is disposed on the first installation region HDD1 of the base plate 30, the first driving portion 300 of the first installation region HDD1 is correspondingly disposed in the first slot 3220, and the two positioning portions 304 of the first installation region HDD1 are correspondingly disposed in the two positioning grooves 3222. At the same time, the restraining member 3248 engages with one of the two restraining portions 3224 to restrain the first sliding member 3244 on the tray 322. At this time, the elastic member 3252 biases the second sliding member 3246 toward a fourth direction D4, such that the interfering portions 3240 are aligned with the receiving recesses 3242.

Then, the user may operate the tray 322 to move toward the first direction D1. When the tray 322 moves with respect to the base plate 30 toward the first direction D1, the first driving portion 300 moves within the first slot 3220 toward the second direction D2 to push the first first sliding member 3244 (i.e. i=1, and for illustration purpose, the first first sliding member 3244 is the rightmost first sliding member 3244 shown in FIG. 17), such that the first interfering portion 3240 moves toward the second direction D2 to extend into the first receiving recess 3242, as shown in FIG. 17. At the same time, a connector of the electronic component 320 shown in FIG. 11 is connected to a connector of a circuit board (not shown) in the data processing device 3. Accordingly, the electronic module 32 may be easily installed on any of the installation regions HDD1-HDD4 of the base plate 30.

As shown in FIG. 17, when the first interfering portion 3240 extends into the first receiving recess 3242, the first interfering portion 3240 pushes the second sliding member 3246 to move toward a third direction D3, such that the other three interfering portions 3240 interfere with the second sliding member 3246. In this embodiment, the third direction D3 is perpendicular to the first direction D1 and the second direction D2. That is to say, a moving direction of the second sliding member 3246 is perpendicular to moving directions of the tray 122 and the first sliding member 3244. In this embodiment, extending directions of the two positioning grooves 3222 and an extending direction of each slot 3220 are parallel to the first direction D1 and the second direction D2, so as to ensure that the tray 322 moves linearly along the first direction D1 and the second direction D2. Furthermore, the substrate 3250 may further comprise a guiding portion 3260 and the second sliding member 3246 may comprise a guiding groove 3262, wherein the guiding portion 3260 is disposed in the guiding groove 3262. An extending direction of the guiding groove 3262 is perpendicular to the first direction D1, so as to ensure that the second sliding member 3246 moves linearly along the third direction D3.

When the electronic component 320 needs to be replaced or repaired, the user may operate the tray 322 to move toward the second direction D2 to detach the electronic module 32 from the base plate 30. After the electronic component 320 is replaced or repaired, the user may install the electronic module 32 on the first installation region HDD1 of the base plate 30. As shown in FIG. 17, when the first interfering portion 3240 extends into the first receiving recess 3242, the other three interfering portions 3240 interfere with the second sliding member 3246. At this time, the other three interfering portions 3240 cannot extend into the corresponding receiving recesses 3242 to be kept at the positions shown in FIG. 17. Thus, as shown in FIG. 18, even if the electronic component 320 is not detached from the tray 322, the user can still view the overlapping condition between the first sliding member 3244 and the slot 3220 from the back of the tray 322, thereby easily recognizing which installation region the electronic module 32 is installed on the base plate 30. Accordingly, the recognition mechanism 324 is able to mark the electronic component 320 during installation, so as to achieve the function of recognition, reduce additional marking man-hours, and reduce labor cost.

Furthermore, if the user installs the electronic module 32 on the wrong position (e.g. the second installation region HDD2 shown in FIG. 19), the second interfering portion 3240 of the recognition mechanism 324 will interfere with the second sliding member 3246 and the tray 322 cannot move toward the first direction D1, such that the electronic module 32 cannot be installed on the wrong position. Accordingly, the recognition mechanism 324 is able to achieve the function of foolproof, reduce the time of wrong disassembly and assembly, and increase the average life of the device.

Moreover, the marked recognition mechanism 324 shown in FIG. 17 may be recovered for use by another electronic component. The user may operate the first sliding member 3244 on the far right to move toward the first direction D1. Then, the elastic member 3252 will bias the second sliding member 3246 toward the fourth direction D4, such that the recognition mechanism 324 can return to the unmarked state shown in FIG. 16.

As mentioned in the above, the recognition mechanism is able to mark the electronic component during installation, so as to achieve the function of recognition, reduce additional marking man-hours, and reduce labor cost. Furthermore, the recognition mechanism is able to achieve the function of foolproof, reduce the time of wrong disassembly and assembly, and increase the average life of the device. Moreover, the marked recognition mechanism may be recovered for use by another electronic component.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing device comprising:
a base plate comprising N driving portions, N being a positive integer larger than 1; and
an electronic module comprising:
an electronic component;
a tray configured to support the electronic component, the tray comprising N slots, positions of the N slots respectively corresponding to positions of the N driving portions, the tray being movably disposed on the base plate, such that an i-th driving portion of the N driving portions is disposed in an i-th slot of the N slots, i being a positive integer smaller than or equal to N; and
a recognition mechanism disposed on the tray, the recognition mechanism comprising N interfering portions and N receiving recesses, positions of the N interfering portions respectively corresponding to positions of the N slots, positions of the N receiving recesses respectively corresponding to positions of the N interfering portions;
wherein, when the tray moves with respect to the base plate toward a first direction, the i-th driving portion moves within the i-th slot toward a second direction to push an i-th interfering portion of the N interfering portions to move, such that the i-th interfering portion extends into an i-th receiving recess of the N receiving recesses; the first direction is opposite to the second direction.

2. The data processing device of claim 1, wherein, when the i-th interfering portion extends into the i-th receiving recess, the other N−1 interfering portions respectively overlap with the other N−1 slots at positions corresponding to the other N−1 driving portions.

3. The data processing device of claim 1, wherein the recognition mechanism further comprises a sliding body, N extending portions and N protruding portions, the N extending portions respectively extend from opposite sides of the sliding body, the N interfering portions are elastic arms respectively extending from ends of the N extending portions, the N protruding portions respectively protrude from opposite sides of the sliding body, and each of the N receiving recesses is correspondingly located between each of the N protruding portions and each of the N extending portions.

4. The data processing device of claim 3, wherein the base plate further comprises an actuating portion, the tray comprises a through hole, the sliding body comprises an actuating groove, the actuating groove has an inclined surface, and the actuating portion is disposed in the actuating groove through the through hole; when the tray moves with respect to the base plate toward the first direction, the actuating portion pushes the inclined surface to drive the sliding body to move toward a third direction; the third direction is perpendicular to the first direction.

5. The data processing device of claim 3, wherein the tray further comprises a guiding portion, the sliding body comprises a guiding groove, the guiding portion is disposed in the guiding groove, and an extending direction of the guiding groove is perpendicular to the first direction.

6. The data processing device of claim 3, wherein the tray further comprises two first restraining portions, the sliding body comprises two second restraining portions, and the two first restraining portions cooperate with the two second restraining portions to restrain the sliding body from moving.

7. The data processing device of claim 1, wherein the recognition mechanism further comprises N first sliding members and a second sliding member, the N interfering portions are respectively located on the N first sliding members, and the second sliding member has the N receiving recesses; when the tray moves with respect to the base plate toward the first direction, the i-th driving portion pushes an i-th first sliding member of the N first sliding members, such that the i-th interfering portion moves to extend into the i-th receiving recess.

8. The data processing device of claim 7, wherein, when the i-th interfering portion extends into the i-th receiving recess, the i-th interfering portion pushes the second sliding member to move toward a third direction, such that the other N−1 interfering portions interfere with the second sliding member; the third direction is perpendicular to the first direction.

9. The data processing device of claim 7, wherein the N receiving recesses are inclined recesses and the N interfering portions are respectively inclined toward the N receiving recesses.

10. The data processing device of claim 7, wherein the recognition mechanism further comprises N restraining members, the N restraining members are respectively disposed on the N interfering portions, the tray further comprises 2N restraining portions, and the N restraining members cooperate with the 2N restraining portions to restrain the N first sliding members from moving.

11. The data processing device of claim 7, wherein the recognition mechanism further comprises an elastic member and opposite ends of the elastic member are respectively connected to the second sliding member and the tray.

12. The data processing device of claim 7, wherein the recognition mechanism further comprises a substrate disposed on the tray, the substrate has N avoidance recesses and N tracks, the N avoidance recesses are disposed with respect to the N tracks and aligned with the N slots, and the N first sliding members are respectively disposed in the N tracks.

13. The data processing device of claim 12, wherein the substrate further comprises a guiding portion, the second sliding member comprises a guiding groove, the guiding portion is disposed in the guiding groove, and an extending direction of the guiding groove is perpendicular to the first direction.

14. The data processing device of claim 12, wherein the recognition mechanism further comprises a cover disposed on the tray and covering the N first sliding members, the second sliding member and the substrate.

15. An electronic module configured to be disposed on a base plate, the base plate comprising N driving portions, N being a positive integer larger than 1, the electronic module comprising:

an electronic component;
a tray configured to support the electronic component, the tray comprising N slots, positions of the N slots respectively corresponding to positions of the N driving portions, the tray being movably disposed on the base plate, such that an i-th driving portion of the N driving portions is disposed in an i-th slot of the N slots, i being a positive integer smaller than or equal to N; and
a recognition mechanism disposed on the tray, the recognition mechanism comprising N interfering portions and N receiving recesses, positions of the N interfering portions respectively corresponding to positions of the N slots, positions of the N receiving recesses respectively corresponding to positions of the N interfering portions;
wherein, when the tray moves with respect to the base plate toward a first direction, the i-th driving portion moves within the i-th slot toward a second direction to push an i-th interfering portion of the N interfering portions to move, such that the i-th interfering portion extends into an i-th receiving recess of the N receiving recesses; the first direction is opposite to the second direction.

16. The electronic module of claim 15, wherein, when the i-th interfering portion extends into the i-th receiving recess, the other N−1 interfering portions respectively overlap with the other N−1 slots at positions corresponding to the other N−1 driving portions.

17. The electronic module of claim 15, wherein the recognition mechanism further comprises a sliding body, N extending portions and N protruding portions, the N extending portions respectively extend from opposite sides of the sliding body, the N interfering portions are elastic arms respectively extending from ends of the N extending portions, the N protruding portions respectively protrude from opposite sides of the sliding body, and each of the N receiving recesses is correspondingly located between each of the N protruding portions and each of the N extending portions.

18. The electronic module of claim 17, wherein the base plate further comprises an actuating portion, the tray comprises a through hole, the sliding body comprises an actuating groove, the actuating groove has an inclined surface, and the actuating portion is disposed in the actuating groove through the through hole; when the tray moves with respect to the base plate toward the first direction, the actuating portion pushes the inclined surface to drive the sliding body to move toward a third direction; the third direction is perpendicular to the first direction.

19. The electronic module of claim 17, wherein the tray further comprises a guiding portion, the sliding body comprises a guiding groove, the guiding portion is disposed in the guiding groove, and an extending direction of the guiding groove is perpendicular to the first direction.

20. The electronic module of claim 17, wherein the tray further comprises two first restraining portions, the sliding body comprises two second restraining portions, and the two first restraining portions cooperate with the two second restraining portions to restrain the sliding body from moving.

21. The electronic module of claim 15, wherein the recognition mechanism further comprises N first sliding members and a second sliding member, the N interfering portions are respectively located on the N first sliding members, and the second sliding member has the N receiving recesses; when the tray moves with respect to the base plate toward the first direction, the i-th driving portion pushes an i-th first sliding member of the N first sliding members, such that the i-th interfering portion moves to extend into the i-th receiving recess.

22. The electronic module of claim 21, wherein, when the i-th interfering portion extends into the i-th receiving recess, the i-th interfering portion pushes the second sliding member to move toward a third direction, such that the other N−1 interfering portions interfere with the second sliding member; the third direction is perpendicular to the first direction.

23. The electronic module of claim 21, wherein the N receiving recesses are inclined recesses and the N interfering portions are respectively inclined toward the N receiving recesses.

24. The electronic module of claim 21, wherein the recognition mechanism further comprises N restraining members, the N restraining members are respectively disposed on the N interfering portions, the tray further comprises 2N restraining portions, and the N restraining members cooperate with the 2N restraining portions to restrain the N first sliding members from moving.

25. The electronic module of claim 21, wherein the recognition mechanism further comprises an elastic member and opposite ends of the elastic member are respectively connected to the second sliding member and the tray.

26. The electronic module of claim 21, wherein the recognition mechanism further comprises a substrate disposed on the tray, the substrate has N avoidance recesses and N tracks, the N avoidance recesses are disposed with respect to the N tracks and aligned with the N slots, and the N first sliding members are respectively disposed in the N tracks.

27. The electronic module of claim 26, wherein the substrate further comprises a guiding portion, the second sliding member comprises a guiding groove, the guiding portion is disposed in the guiding groove, and an extending direction of the guiding groove is perpendicular to the first direction.

28. The electronic module of claim 26, wherein the recognition mechanism further comprises a cover disposed on the tray and covering the N first sliding members, the second sliding member and the substrate.

* * * * *